J. L. ENGLEHART.
Butter-Worker.
No. 160,089.  Patented Feb. 23, 1875.
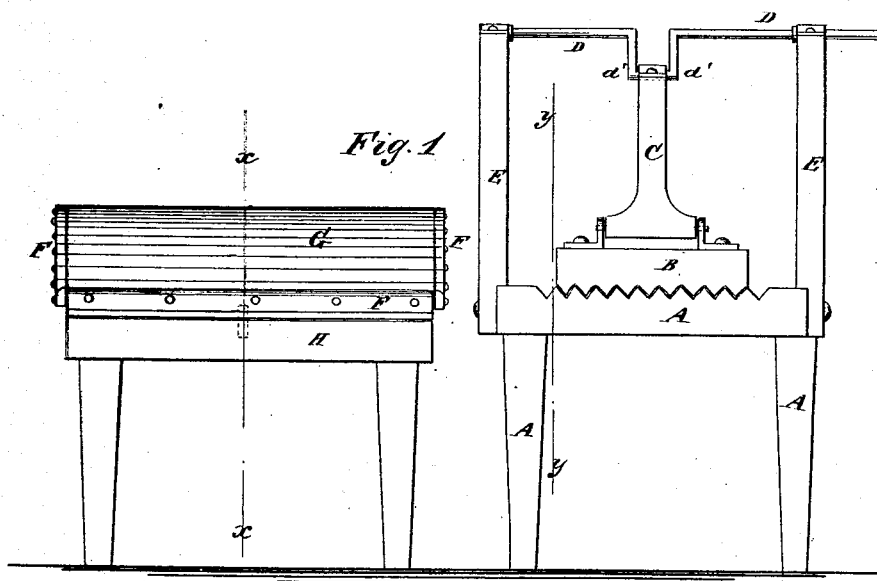
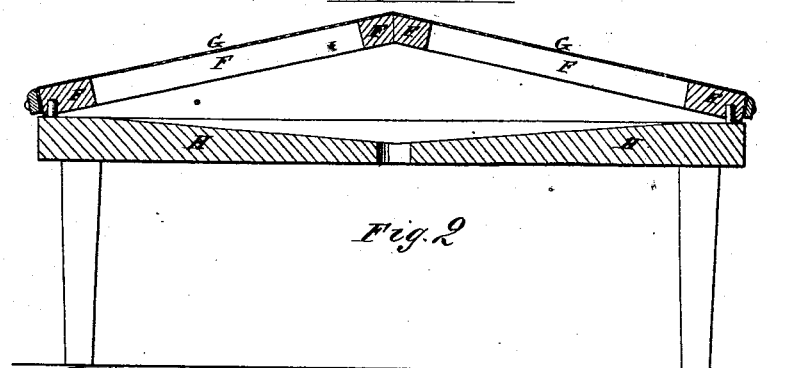
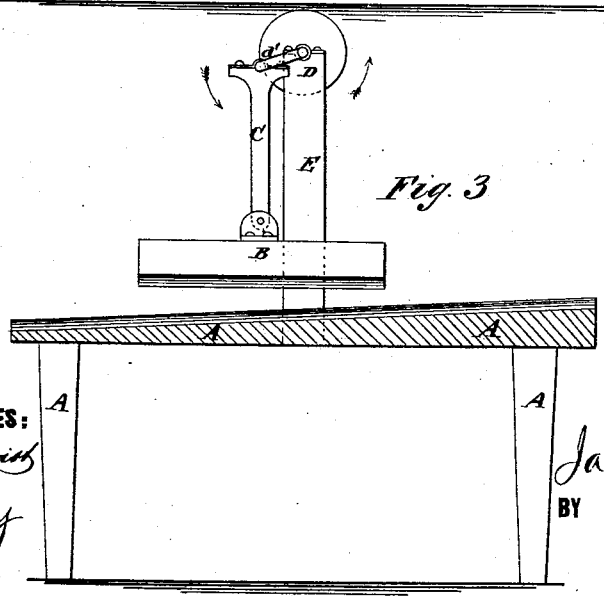
WITNESSES:
A. W. Almquist
A. F. Terry
INVENTOR:
Jacob L. Englehart
BY
ATTORNEYS.

UNITED STATES PATENT OFFICE.

JACOB L. ENGLEHART, OF NEW YORK, N. Y.

IMPROVEMENT IN BUTTER-WORKERS.

Specification forming part of Letters Patent No. 160,089, dated February 23, 1875; application filed November 7, 1874.

*To all whom it may concern:*

Be it known that I, JACOB L. ENGLEHART, of the city, county, and State of New York, have invented a new and Improved Mechanism for Working Butter, of which the following is a specification:

Figure 1 is a front view of my improved mechanism. Fig. 2 is a detail section of the same, taken through the line $x\ x$, Fig. 1. Fig. 3 is a detail section of the same, taken through the line $y\ y$, Fig. 1.

Similar letters of reference indicate corresponding parts.

The invention will first be fully described, and then pointed out in the claim.

A is a bench or table, the top of which is slightly inclined, and is corrugated or grooved longitudinally, as shown in Figs. 1 and 2. This bench is covered with an absorbing device or cloth, A'. The butter is worked upon the bench A with ladles and other suitable implements. When the butter is hard it is crushed and worked by means of the block B, the face of which is corrugated or grooved to correspond with the grooving of the top of the bench A. To the middle part of the side edges of the block B is pivoted the wide or cross-head lower end of the suspending-bar C, the upper end of which is pivoted to the crank $d'$, formed upon the shaft D. The shaft D revolves in bearings in the upper ends of the standards E, the lower ends of which are attached to the middle part of the side edges of the top of the bench A. The shaft D is revolved by hand or by other convenient power.

In using the device, the butter is placed upon the cloth A', which rests on the bench A, and is crushed and worked by the block B as it is moved up and down by the revolutions of the crank-shaft, thereby pressing, crushing, and rendering the butter soft, and causing the water and other liquids to exude, which liquids are absorbed by the cloth A', and the excess flows down the grooves of the bench. The block B is guided by the operator, who takes hold of the bar C. When the butter has been sufficiently worked upon the cloth A' and bench A it is transferred to the finishing-table, the top of which is formed of two frames or racks, F, over which is stretched a cloth, G. The inner bars of the frames F are beveled off and rest against each other, and their outer ends are secured to the ends of the table-body H by dowel-pins or other convenient means, so that the table-top may incline from the center toward each end. The two frames F may be built as a single V-shaped frame, if desired. The upper side of the body H of the table inclines from its edges toward the center, where it is perforated, as shown in Fig. 3, so that the water and milk worked from the butter may be received upon the said body, and may flow into a receiver placed beneath it. The cloth G absorbs the water and milk adhering to the particles of butter, and allows them to drip upon the body H of the table, thus enabling said water and milk to be more thoroughly removed than they could be without said cloth.

I do not wish to limit myself to the precise construction herein shown, as its form may be changed in various ways without departing from my invention.

Having thus described my invention, I claim as new and desire to secure by Letters Patent—

The combination of crusher B, flexibly pendent, and inclined table A, both correspondingly corrugated, as and for the purpose described.

JACOB L. ENGLEHART.

Witnesses:
   T. B. MOSHER,
   ALEX. F. ROBERTS.